July 29, 1958 R. R. CARLTON 2,844,934
ADJUSTABLE LAWN TRIMMER
Filed Jan. 3, 1957

INVENTOR.
RAYMOND R. CARLTON
BY
ATTORNEYS

# United States Patent Office 2,844,934
Patented July 29, 1958

2,844,934

ADJUSTABLE LAWN TRIMMER

Raymond R. Carlton, Portland, Oreg., assignor to Oregon Saw Chain Corp., Portland, Oreg., a corporation of Oregon Application January 3, 1957, Serial No. 632,343

1 Claim. (Cl. 56—256)

The present invention relates to a lawn and garden tool, and more particularly to a tool for trimming lawns along the edges of walks, driveways, gardens and the like.

It is a particular object of the invention to provide an improved lawn trimmer of the type having a fixed blade engaging a rotating, shearing blade, such as shown in the Chadwick Patent No. 2,660,854. With such trimmers it is desirable, in some instances, that the fixed blade penetrate beneath the surface of the ground during the trimming operation. However, if the soil is extremely gravelly and if the fixed blade were to penetrate the ground deeply, it would rapidly become dulled and there is the possibility of otherwise injuring the tool. Therefore, it is desirable where gravelly ground is encountered to raise the fixed cutter blade so that it penetrates the ground either not at all or at a minimum depth. In other instances, the grass to be trimmed is spaced above the surface of the ground at such a height that if the fixed cutter blade penetrates the ground deeply, such grass is not trimmed. Accordingly, in those instances also, it is desired to raise the fixed cutter blade so as to better trim such grass.

It is, therefore, an object of the invention to provide a trimmer having means for adjusting the position of the fixed cutter blade so as to raise or lower its relation to the surface of the ground when the tool is in its operating position.

Another object of the invention is to provide an arrangement for adjusting the fixed cutter blade of the grass trimming tool that is simple in construction and easy to manipulate.

Still another object is to provide an adjustment arrangement that is simple and inexpensive to manufacture.

The resistance to movement of the tool when the fixed blade penetrates the ground occasionally is so great as to hamper the use of the tool and it is, therefore a further object of the invention to make it possible to raise the blade of a trimming tool of the class described and lessen the effort required to move the tool in trimming a lawn.

Other objects and advantages of the invention will become more apparent hereinafter.

The illustrated embodiment of the invention comprises a handle by which the tool may be pushed along the edge of the curb or sidewalk, the handle having at its lower end a forked bracket between which is mounted a ground engaging wheel. Attached to the wheel is a flat shearing disc having a number of teeth formed on its periphery and against which a fixed shearing plate bears. The shearing plate is formed with two spaced apart blades which are alternatively operable with the shearing teeth depending upon the direction of operation of the tool. The shearing blade is pivotable about the axle supporting the wheel, and a lever arrangement is provided so that the shearing blade in the operative position may be raised or lowered relative to the ground, as desired.

For a more detailed description of the invention, reference is made to the accompanying drawings, wherein.

Figures 1, 2, 3, 4:
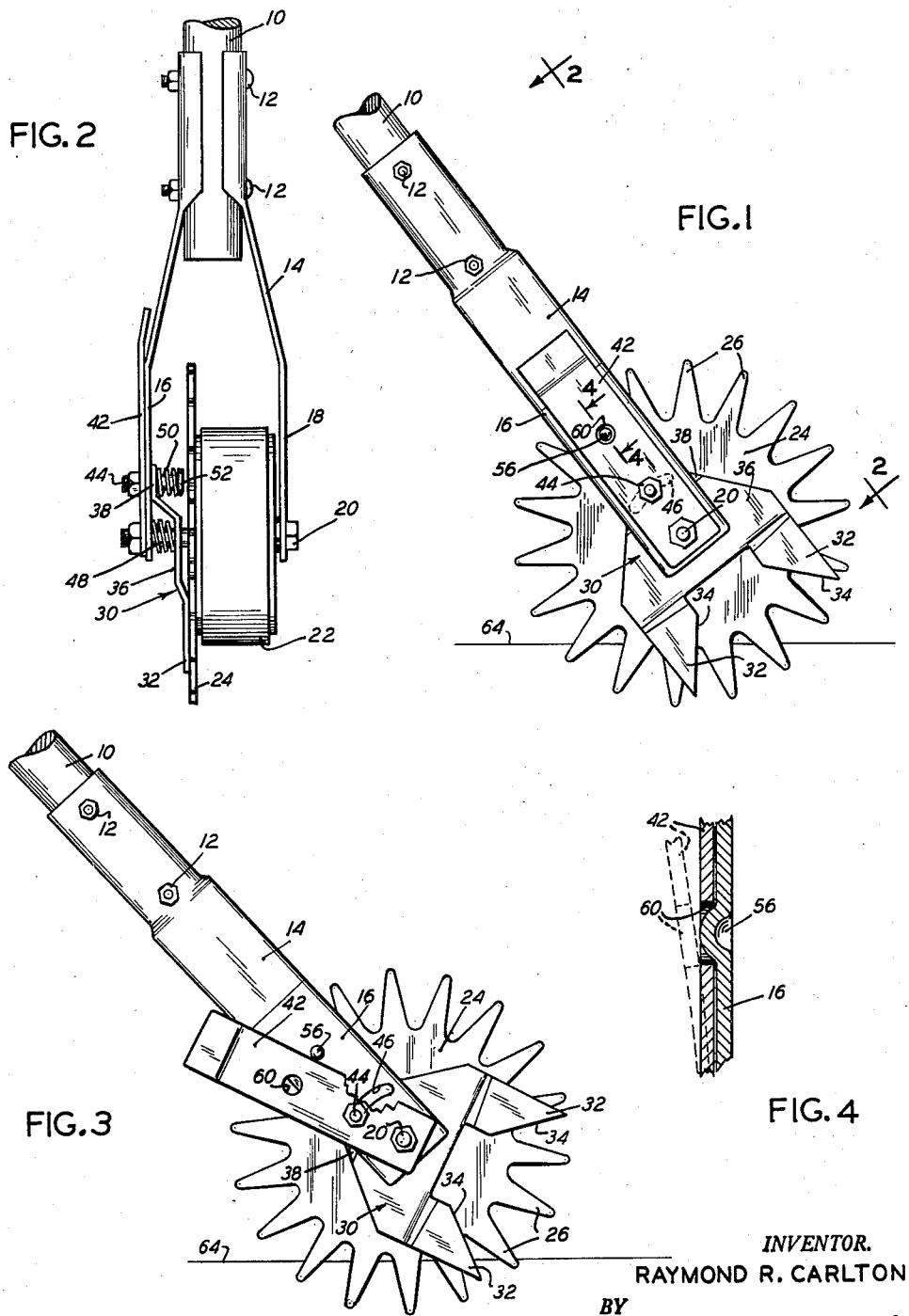
Fig. 1 is a side elevation of the tool showing it in operating position.
Fig. 2 is an end view of the tool looking in the direction of the arrows 2—2 of Fig. 1.
Fig. 3 is a further side elevation of the tool showing it with the cutter blade in a different operating position than shown in Fig. 1 and with part of the tool broken away to show a detail thereof.
Fig. 4 is an enlarged, sectional view taken along line 4—4 of Fig. 1.

The tool of the invention includes a handle 10 of any suitable material, and preferably of such length that the user of the tool may use the tool to trim a lawn or garden while standing upright. Secured to the lower end of the handle 10 by suitable means such as bolts 12 is a forked bracket 14 having opopsite legs 16, 18, which support, at their lower ends, an axle 20.

In the modification of the invention illustrated in the drawings, a single wheel 22 is rotatably mounted upon the axle 20. Secured to the wheel 22 by suitable means on the side of the wheel facing the leg 16 is a flat shearing disc 24 formed on its periphery with a plurality of shearing teeth 26. The shearing disc 24 will, of course, rotate with the wheel 22.

Pivotally mounted on the axle 20 between the shearing disc 24 and the bracket leg 16 is a shear plate 30 formed at its lower ends with a pair of shear blades or fingers 32 having inclined shearing edges 34.

With reference to Fig. 2, it will be noted that the shear plate 30 is of stepped or offset configuration and that the shear blades 32 lie flatly against the shearing disc 24 parallel to the plane of the latter. The central portion of the shearing plate indicated at 36 in Fig. 1 is offset from the shearing disc 24 towards the bracket leg 16 while the uppermost part 38 of the shearing plate is likewise offset from the plane of the center section 36 and, as shown in Fig. 2, abuts against the bracket leg 16.

Pivotally mounted on the axle 20 on the outer side of the bracket leg 16 is an adjustment lever 42 which extends generally upwardly along the leg 16. The upper part of the shear plate 30 is secured to the lever 42 by a bolt means 44 which extends through a slot 46 in the bracket leg 16, the slot being arcuate about the axis of the axle 20.

To urge the shear blades 32 into engagement with the shearing disc 24, a helical compression spring 48 is provided about the axle 20 between the bracket leg 16 and the central portion 36 of the shear plate, and a helical compression spring 50 is provided between the head 52 on the bolt means 44 and the inner side of the shear plate 30. This mounting of the shear plate 30 permits the shear plate to move away from the shearing disc 24 in the event foreign material is forced between the shear plate and the shearing disc, thus preventing injury or deformation of either.

The lever 42 is preferably formed of spring steel and in its normal position lies flatly against the outer side of the bracket leg 16, as shown in Fig. 2. By pivoting the lever 42 about the axle 20, the position of the shear blade 30 can be adjusted, as is best seen in comparing Figs. 1 and 3.

Preferably, interengaging means are provided on the lever 42 and bracket leg 16 to retain the lever in its various positions of adjustment. In the embodiment illustrated, such means comprise a knob or button 56 formed on the bracket leg 16 which is adapted to engage within a notch or opening 60 in the lever 42 in the intermediate position of the lever. The notch 60 and button 56 can be disengaged by springing the lever 42 outwardly to the position shown in dotted lines in Fig. 4, whereafter the lever can be swung from one side or the other, as indicated in Fig. 3. Preferably, the limits of the slot 46 are such that when the lever is in one of its side positions, the bolt means 44 is in engagement with the corresponding end of the slot and the button 56 is in engagement with the side of the lever 42.

In using the tool of the invention, the handle 10 is inclined toward the operator substantially at the angle shown in Figs. 1 and 3 with the wheel 22 engaging the surface 64 of the ground, pavement or sidewalk. As the operator pushes the tool along such a surface, the wheel 22 and shearing disc rotate with respect to the shear blades 32, causing the grass and vegetation which are caught between the cutting edges of a shear blade and the shearing disc teeth 26 to be severed.

In some instances it will be desired to use the tool of the invention with the shearing plate in a position such as shown in Fig. 1 and wherein one of the shear blades 32 extends substantially vertically beneath the axle 20 and relatively deeply beneath the ground surface 64. However, in gravelly soil or in instances such as along curbings and the like where the sod may be substantially above the surface 64, it may be desirable or preferable to raise the shearing blade so that it does not dig so deeply into the ground, or so that the blade or finger will be positioned to sever the vegetation spaced above the surface 64. In such instances, the shear plate 30 may be swung to a position such as shown in Fig. 3. Of course, the shear plate may be swung to either side, depending upon the direction in which it is desired to push or move the tool.

It will also be apparent that with the blade of the tool raised there will be less resistance to movement of the tool and hence less effort on the part of the operator will be required.

Having illustrated and described a preferred embodiment of the invention, it should be apparent to those skilled in the art that the invention permits of modification in arrangement and detail. I claim as my invention all such modifications as come within the true spirit and scope of the appended claim.

I claim:

In a lawn and garden trimming tool, a handle, a bracket on one end of such handle having a leg extending generally parallel to said handle, an axle carried by said bracket, a rotatable ground engaging wheel mounted on said axle, a shearing disc coaxially mounted on said axle between said bracket leg and said wheel and fixed to the latter for rotation therewith, an elongate shear plate pivotally mounted on said axle between said bracket leg and said wheel, said shear plate having a lower part defining a pair of spaced shear blades for cooperation with said shearing disc, an adjustment lever pivotally mounted on said axle on the side of said bracket leg opposite said shear plate and extending generally upwardly along said leg and resiliently engaging the same, bolt means extending through said bracket leg above said axle securing said lever to said shear plate, said bracket leg having a transverse slot through which said bolt means passes, and cooperating means on said bracket leg and said lever for holding said lever in various positions of adjustment comprising a knob means protruding from said leg and an aperture formed in said lever for receiving said knob in the medial position of adjustment of said plate, said slot being formed so that said bolt engages the corresponding end thereof in a desired limit position of said plate, and said lever having a width such that upon movement of said shear plate to a limit position said knob engages a side edge of said lever, said lever being adapted to be manually biased away from said leg and out of engagement of said knob to permit movement of the lever in adjustment of the position of the shear plate.

References Cited in the file of this patent

UNITED STATES PATENTS

| | | |
|---|---|---|
| 2,528,929 | Wessendorf | Nov. 7, 1950 |
| 2,574,453 | Whitaker | Nov. 6, 1951 |
| 2,660,854 | Chadwick | Dec. 1, 1953 |